United States Patent
Koyama et al.

(10) Patent No.: US 7,097,439 B2
(45) Date of Patent: Aug. 29, 2006

(54) MANUFACTURING DEVICE AND MANUFACTURING METHOD FOR SYNTHETIC RESIN HOLLOW MOLDED BODY

(75) Inventors: Hiroshi Koyama, Kariya (JP); Tetsuya Kuno, Kariya (JP)

(73) Assignee: Toyoda Boshoku Corporation, Kariya (JP)

(*) Notice: Subject to any disclaimer, the term of this patent is extended or adjusted under 35 U.S.C. 154(b) by 329 days.

(21) Appl. No.: 10/627,916

(22) Filed: Jul. 28, 2003

(65) Prior Publication Data

US 2004/0071807 A1    Apr. 15, 2004

(51) Int. Cl.
*B29C 45/14* (2006.01)

(52) U.S. Cl. .................. 425/112; 425/116; 425/120; 425/123; 425/125; 425/129.1

(58) Field of Classification Search .............. 425/112, 425/116, 120, 123, 125, 129.1
See application file for complete search history.

(56) References Cited

U.S. PATENT DOCUMENTS

| | | | |
|---|---|---|---|
| 3,832,110 A * | 8/1974 | Hehl .......................... | 425/130 |
| 5,445,782 A * | 8/1995 | Sadr .......................... | 264/513 |
| 6,363,900 B1 * | 4/2002 | Homi et al. .................. | 123/184.21 |
| 6,372,170 B1 | 4/2002 | Nishida et al. ............... | 425/129.1 |
| 6,428,730 B1 * | 8/2002 | Nishida ....................... | 264/255 |
| 6,579,486 B1 * | 6/2003 | Nakajima et al. ............. | 264/255 |

FOREIGN PATENT DOCUMENTS

| | | | |
|---|---|---|---|
| DE | 19954587 A1 * | 5/2000 | |
| EP | 1 060 868 A1 | 12/2000 | |
| EP | 1 099 536 A1 | 5/2001 | |
| JP | A 4-331123 | 11/1992 | |
| JP | A 6-297501 | 10/1994 | |
| JP | 11042670 A * | 2/1999 | |
| JP | 2001277284 A * | 10/2001 | |
| JP | A 2002-79542 | 3/2002 | |

\* cited by examiner

*Primary Examiner*—Robert B. Davis
(74) *Attorney, Agent, or Firm*—Oliff & Berridge, PLC (57) ABSTRACT

A manufacturing device for a synthetic resin hollow molded body molds a first split assembly member, a second split assembly member, and a third split assembly member by a first injection, and joints each of contact portions of the three members with a corresponding contact portion by a second injection. The manufacturing device includes an ejecting mechanism which moves the second split assembly member in a die opening/closing direction, a rotating mechanism which rotates the third split assembly member around a shaft center in the die opening/closing direction, and a sliding mechanism which slides the second split assembly member and the third split assembly member in a direction perpendicular to the die opening/closing direction. According to the manufacturing device, while the dies are open after the first injection, the three members are made different by the ejecting mechanism, and then the three members are made to face one another by the rotation mechanism and the sliding mechanism in the die opening/closing direction.

3 Claims, 7 Drawing Sheets

MANUFACTURING DEVICE AND MANUFACTURING METHOD FOR SYNTHETIC RESIN HOLLOW MOLDED BODY

INCORPORATION BY REFERENCE

The disclosure of Japanese Patent Application No. 2002-047005 filed on Feb. 22, 2002 including the specification, drawings and abstract is incorporated herein by reference in its entirety.

BACKGROUND OF THE INVENTION

1. Field of the Invention

The invention relates to a manufacturing device and a manufacturing method for a synthetic resin hollow molded body. More particularly, the invention relates to a manufacturing device and a manufacturing method for efficiently manufacturing a synthetic resin hollow molded body including three members, which are a first split assembly member, a second split assembly member and a third split assembly member. The invention is widely applied to manufacture of an intake manifold and the like of an internal combustion engine, and to a field related thereto.

2. Description of the Related Art

Figure 10:
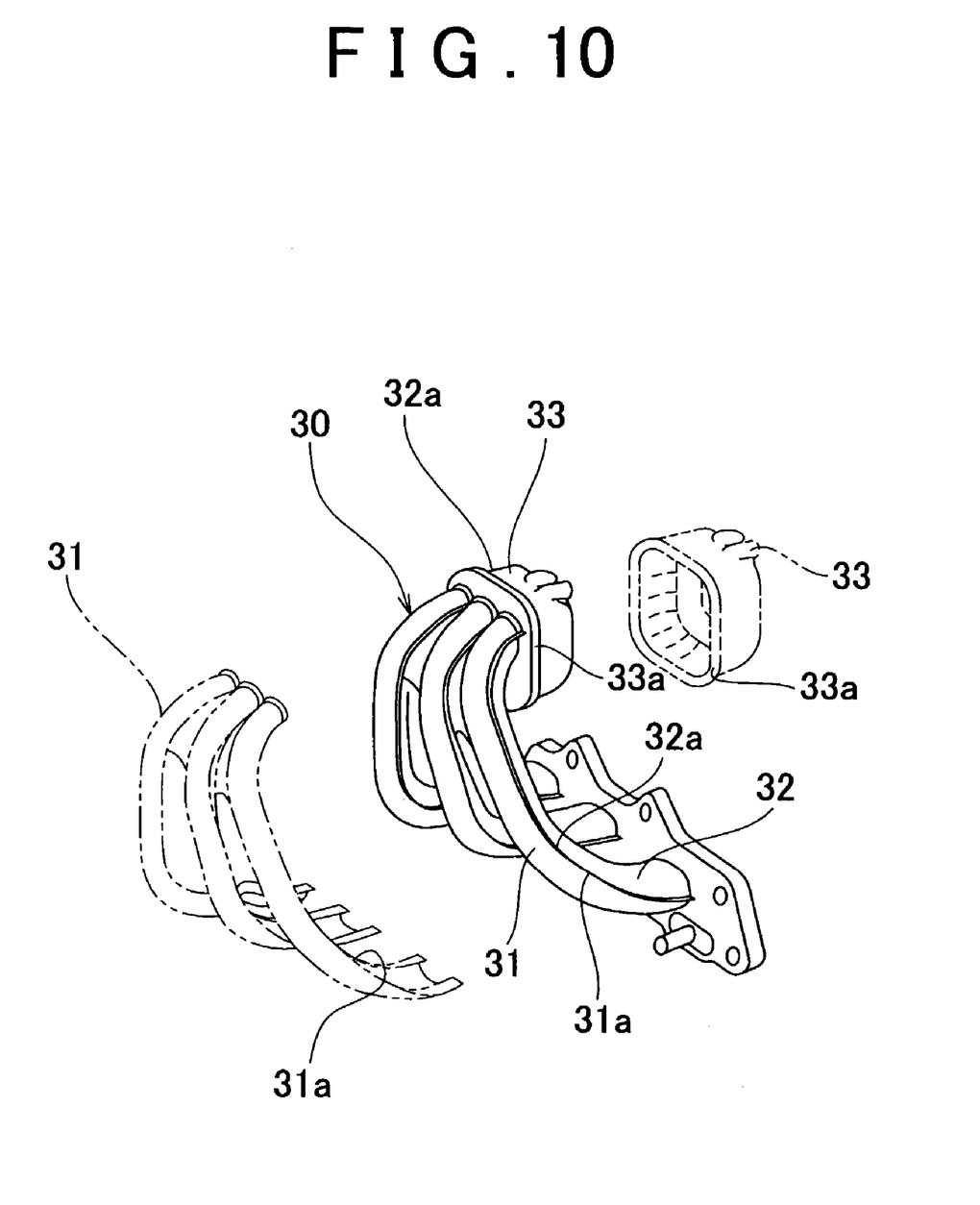
FIG. 10 is a perspective view showing an intake manifold.

As a synthetic resin hollow molded body, there is a complex-shaped product, such as an intake manifold for an automobile, which includes a plurality of nonlinear pipes. As shown in FIG. 10, an intake manifold 30 includes a first split assembly member 31, a second split assembly member 32, which make a pair, and a box-shaped third split assembly member 33 which is provided on an end portion of the second split assembly member 32. As a manufacturing method for the intake manifold, a method including an injection molding process and a vibration welding process is known. In the injection molding process, contact portions of the first split assembly member and second split assembly member that are molded by a first injection are jointed by a second injection. In the vibration welding process, the contact portion of the jointed second split assembly member and the contact portion of the third split assembly member are jointed by the vibration welding or the like. As a conventional injection molding device used in the aforementioned injection molding process, for example, an injection molding devices disclosed in Japanese Patent-Laid Open Publication No. 4-331123 and Japanese Patent Laid-Open Publication No.6-297501 are known. Japanese Patent Laid-Open Publication No. 4-331123 discloses the injection molding device including a sliding mechanism which relatively slides the first split assembly member and second split assembly member so as to make them face each other in a die opening/closing direction, such that the contact portions of the first split assembly member and the second split assembly member, which are molded by the first injection, contact each other. Japanese Patent Laid-Open Publication No. 6-297501 discloses the injection molding device including a rotating mechanism which relatively rotates the first split assembly member and the second split assembly member so as to make them face each other in the die opening/closing direction.

In the aforementioned conventional manufacturing method for an intake manifold, the intake manifold is manufactured through the injection molding process and the vibration welding process. Accordingly, it is necessary to control the two different, manufacturing processes, which reduces manufacturing efficiency. In addition, as manufacturing equipment, both an injection molding device used in the injection molding process and a vibration welding device used in the vibration welding process are required, which increases a cost of equipment. Further, generally, only a molded product having a relatively simple shape can be molded by the vibration welding, and a flash receiver needs to be provided, which reduces flexibility in designing a molded product. Therefore, in order to solve the aforementioned problems, a method can be suggested in which the vibration welding process is not performed and the intake manifold is manufactured only by the injection molding process, that is, a method for manufacturing the intake manifold including the first split assembly member, second split assembly member, and the third split assembly member using the conventional injection molding device. However, in the conventional injection molding device, the sliding mechanism (or the rotating mechanism) is appropriate for relatively moving the two members, which are the first split assembly member and the second split assembly members. Accordingly, even when two sliding mechanisms (or the two rotating mechanisms) are simply provided, or both the sliding mechanism and the rotating mechanism are simply provided, it is impossible to appropriately move the three members, which are the first split assembly member, second split assembly member, and the third split assembly member, so as to make them face one another in the die opening/closing direction. Further, for example, when two sliding mechanisms are simply provided, driving means such as a hydraulic cylinder which forms the sliding mechanism protrudes in a direction in which the sliding mechanism slides, which results in upsizing of the entire device. When two rotating mechanisms are simply provided, the entire device is also upsized so as to obtain a rotation area for the rotating mechanisms.

SUMMARY OF THE INVENTION

Accordingly, the invention is made in order to address the problem described above. It is an object of the invention to provide a compact and simply-structured manufacturing device for a synthetic resin hollow molded body for efficiently manufacturing a synthetic resin hollow molded body including three members, that are a first split assembly member, a second split assembly member and a third split assembly member. It is another object of the invention to provide a manufacturing method for a synthetic resin hollow molded body, for efficiently manufacturing a synthetic resin hollow molded body which includes the three members, that are the first split assembly member, second split assembly member, and the third split assembly members, and which has high flexibility in design.

According to an aspect of the invention, a manufacturing device for a synthetic resin hollow molded body includes a first die, a second die, an ejecting mechanism, a rotating mechanism and a sliding mechanism. The first die and the second die mold a first split assembly member, a second split assembly member, and a third split assembly member which are molded by a first injection and each of which has a contact portion that is jointed with a corresponding contact portion by a second injection. The ejecting mechanism moves at least one of the first split assembly member, second split assembly member, and the third split assembly member in the die opening/closing direction such that a phase of the moved member is made different from phases of the other members in the die opening/closing direction while the first die and the second die are open. The rotating mechanism rotates at least one of the first split assembly member, second split assembly member, and the third split assembly member around a shaft center in the die opening/closing direction while the first die and the second die are open. The sliding mechanism slides at least one of the first split assembly member, second split assembly member, and the third split assembly member in a direction perpendicular to the die opening/closing direction while the first die and the second die are open. The ejecting mechanism, the rotating mechanism and the sliding mechanism make the first split assembly member, second split assembly member, and the third split assembly member face one another in the die opening/closing direction.

According the aspect of the invention, in the manufacturing device for a synthetic resin hollow molded body, each of the contact portions of the three members contacts the corresponding contact portion when the dies are closed, and then each of the contact portions is jointed with the corresponding contact portion by the second injection. Thus, it is possible to efficiently manufacture the synthetic resin hollow molded body. Also, since the manufacturing device includes the ejecting mechanism, the sliding mechanism and the rotating mechanism, it is possible to realize a relatively compact and simply-structured manufacturing device.

The sliding mechanism may include a sliding member which is supported by the second die body so as to be slidable in the direction perpendicular to the die opening/closing direction, and a slide driving portion which slides the sliding member. The ejecting mechanism may include an ejecting member which is supported by the sliding member so as to be movable in the die opening/closing direction, and an ejection driving portion which moves the ejecting member. The rotating mechanism may include a rotating member which is supported by the sliding member so as to be rotatable around the shaft center in the die opening/closing direction, and a rotation driving portion which rotates the rotating member. The first die may include a female die portion for molding the first split assembly member, a female die portion for molding the second split assembly member, and a female die portion for molding the third split assembly member. The sliding portion may include a male die portion for molding the first split assembly member. The ejecting member may include a male die portion for molding the second split assembly member. The rotating member may include a male die portion for molding the third split assembly member. Thus, it is possible to manufacture the synthetic resin hollow molded body more efficiently, and to realize a more compact and simply-structured manufacturing device.

The "rotating member" may include the female die portion for molding the third split assembly member and an insert die portion for molding the second split assembly member at rotationally symmetrical positions. Thus, it is possible to manufacture a synthetic resin hollow molded body having a more complex shape. The aforementioned "male die portion for molding the second split assembly member" may include a slide core which is slidable in a predetermined direction. Thus, it is possible to manufacture a synthetic resin hollow molded body having a more complex shape. In addition, the "first die" may include the male die portions arranged in the direction perpendicular to the die opening/closing direction. Thus, it is possible to manufacture a more compact and simply-structured manufacturing device.

According to an aspect of the invention, a manufacturing method for a synthetic resin hollow molded body includes a first injection molding process, a positioning process and a second injection molding process. In the first injection molding process, a first split assembly member, a second split assembly member and a third split assembly member are molded by a first injection between a first die and a second die. In the positioning process, phases of the first split assembly member, second split assembly member, and the third split assembly member are made different in a die opening/closing direction, and then first split assembly member, second split assembly member, and the third split assembly member are made to face one another in the die opening/closing direction while the first die and the second die are open. In the second injection molding process, each of the contact portions of the first split assembly member, second split assembly member, and the third split assembly member is made to contact the corresponding contact portion and each of the contact portions is jointed with the corresponding contact portion by a second injection between the first die and the second die. Thus, it is possible to manufacture the synthetic resin hollow molded body including the three members, which are the first split assembly member, second split assembly member, and the third split assembly member, only by the injection molding process. Accordingly, it is possible to manufacture the synthetic resin hollow molded body more efficiently than when the synthetic resin hollow molded body is manufactured through the injection molding process and vibration welding process. In addition, flash or the like is not generated, which makes it possible to manufacture a synthetic resin hollow molded body having higher flexibility in design and the like.

In the positioning process, the first split assembly member, second split assembly member, and the third split assembly member may be made to face one another in the following manner. The second split assembly member is moved in the die opening/closing direction such that the phases of the first split assembly member, second split assembly member, and the third split assembly member are made different in the die opening/closing direction. Then, the third split assembly member is rotated around the shaft center in the die opening/closing direction such that second split assembly member, and the third split assembly member face each other in the die opening/closing direction. Then, second split assembly member, and the third split assembly member are slid in the direction perpendicular to the die opening/closing direction. Thus, it is possible to manufacture the synthetic resin hollow molded body having a higher flexibility in design more efficiently.

DETAILED DESCRIPTION OF THE PREFERRED EMBODIMENTS

Figure 11:
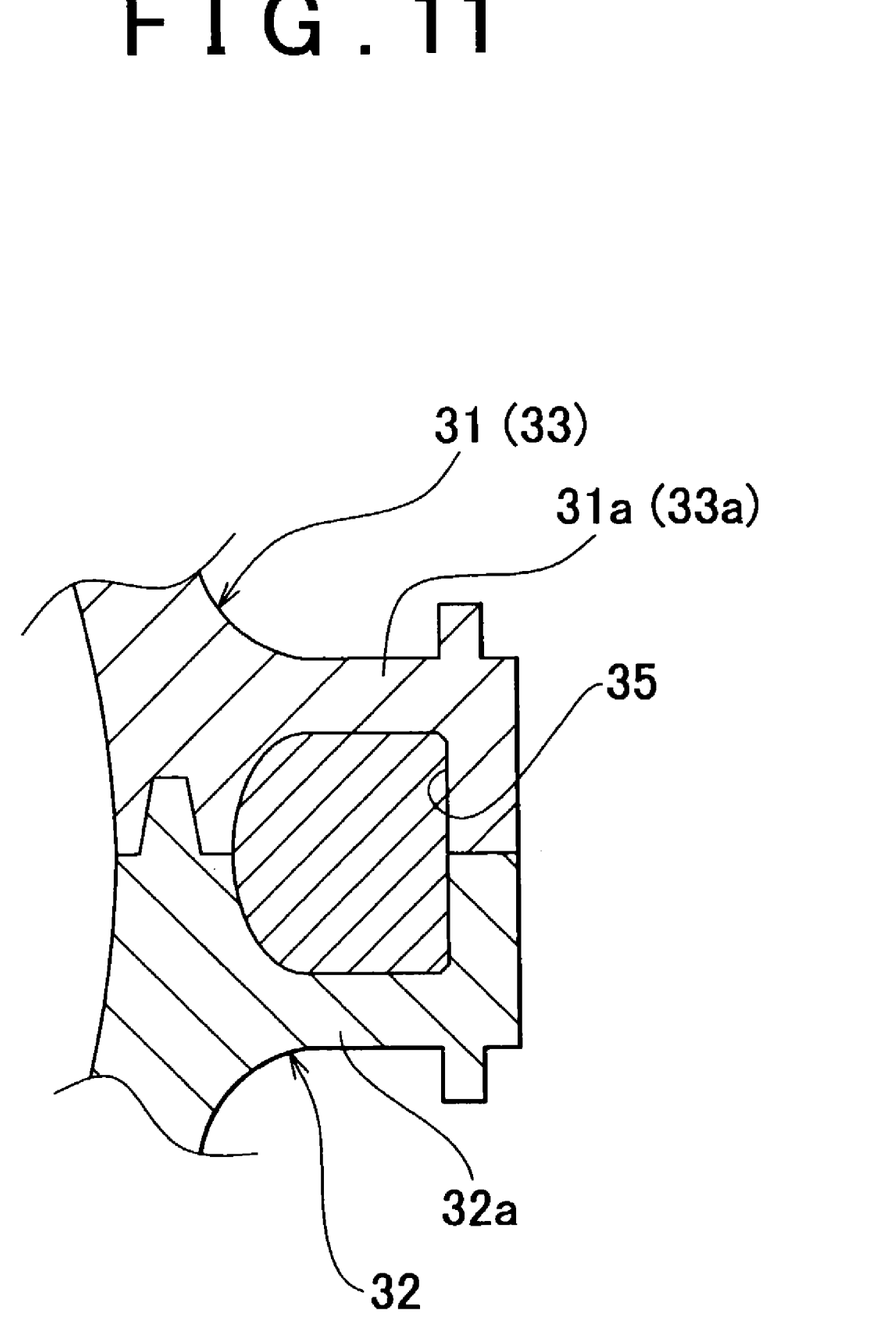
FIG. 11 is a sectional view showing contact portions of the intake manifold.

Hereafter, an embodiment according to the invention will be described in detail with reference to accompanying drawings. In the embodiment, as a synthetic resin hollow molded body, an intake manifold 30 for an automobile will be described as an example, as shown in FIG. 10. The intake manifold 30 includes a first split assembly member 31, a second split assembly member 32 which are formed as split portions of plural (three in the figure) nonlinear pipes, and a box-shaped third split assembly member which has an opening on one side thereof. As shown in FIG. 11, when a contact portion 31a of the first split assembly member 31 and a contact portion 32a of the second split assembly member 32 are made to contact each other, or when the contact portion 32a of the second split assembly member 32 and a contact portion 33a of the third split assembly member 33 are made to contact each other, a closed hollow passage 35 including a circular arc surface and a curved surface having a substantially U-shaped cross section is formed so as to be surrounded by the contact portion 31a, 32a, 33a. Then, each of the contact portions 31a, 32a, 33a is jointed with the corresponding contact portion by molten resin supplied to the hollow passage 35. As a manufacturing device for a synthetic resin hollow molded body according to the invention, an injection molding device for the intake manifold will be described as an example.

(1) Structure of Injection Molding Device

Figure 1:
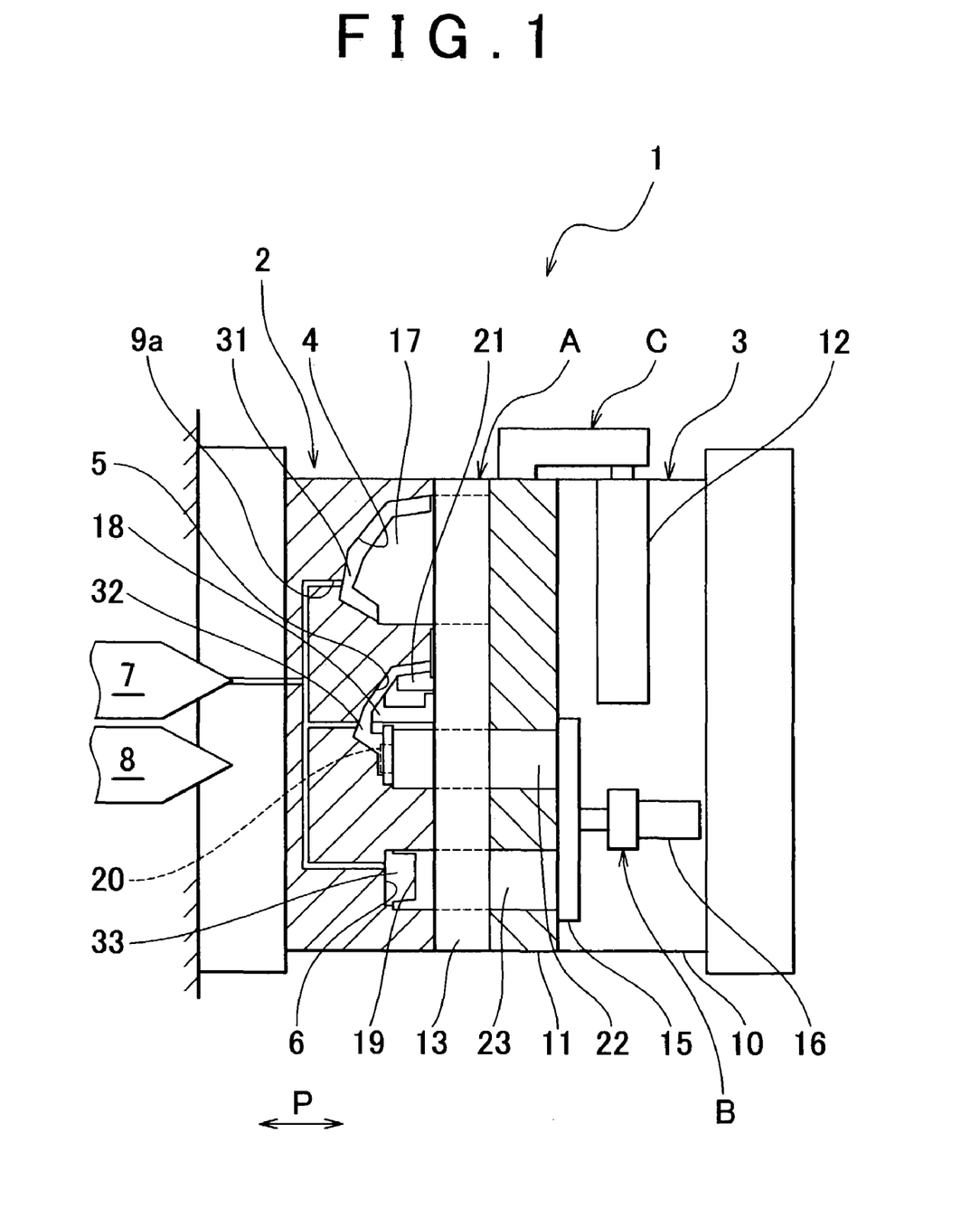
FIG. 1 is a sectional view showing an injection molding device according to an embodiment of the invention at a first injection molding time when dies are closed.

An injection molding device 1 according to the invention includes a fixed die 2 (shown as a first die) and a movable die 3 (shown as a second die), as shown in FIG. 1. The fixed die 2 includes a female die portion 4 for molding the first split assembly member 31, a female die portion 5 for molding the second split assembly member 32, and a female die portion 6 for molding the third split assembly member 33. The female die portion 4, the female die portion 5, and the female die portion 6 are arranged in the direction (the vertical direction in the figure) perpendicular to the die opening/closing direction P. The fixed die 2 includes a first injection nozzle 7 and a second injection nozzle 8 which can inject the molten resin. The first injection nozzle 7 communicates with the female die portion 4, the female die portion 5 and the female die portion 6 through a runner 9a. The second injection nozzle 8 communicates with the female die portion 4 through a runner 9b (refer to FIG. 6). It is preferable that the same type of the molten resin be injected from the first nozzle 7 and the second injection nozzles 8.

The movable die 3 includes a movable die body 10 (shown as the second die body in FIG. 2) which can move in the die opening/closing direction P by moving means (not shown), and an ejecting mechanism A, a rotating mechanism B and a sliding mechanism C which are provided on the movable die body 10. The sliding mechanism C includes a sliding member 11 (refer to FIG. 5) which is supported by the movable die body 10 so as to be slidable in the direction perpendicular to the die opening/closing direction P (in the vertical direction in the figure), and a drive cylinder 12 (shown as slide driving means) which slides the sliding member 11. The drive cylinder 12 is arranged in the movable die body 10 in a direction in which the sliding member 11 slides. The ejecting mechanism A includes an ejecting plate 13 (shown as an ejecting member in FIG. 3) which is supported by the sliding member 11 so as to be movable in the die opening/closing direction P, and a drive cylinder (not shown)(described as ejection driving means) which moves the ejecting plate 13. The rotating mechanism B includes a rotating plate 15 (shown as a rotating member in FIG. 4) which is supported by the sliding member 11 so as to be rotatable around the shaft center in the die opening/closing direction P, and a drive motor 16 (shown as rotation driving means) which rotates the rotating plate 15. The drive motor 16 is arranged in the movable die body 10 in the die opening/closing direction P.

The sliding member 11 includes a male die portion 17 which forms a cavity with the female die portion 4 for molding the first split assembly member 31. The ejecting plate 13 includes a male die portion 18 which forms a cavity with the female die portion 5 for molding the second split assembly member 32. The male die portion 18 includes a slide core 21 which is slidable in a predetermined direction (refer to FIG. 7). Rotors 22, 23, which make a pair and extend along a rotational shaft, are provided on one surface of the rotating plate 15 at rotationally symmetrical positions with respect to the rotational shaft. One rotor 22 includes an insert die portion 20 for molding an end portion of the second split assembly member 32. The other rotor 23 includes a male die portion 19 which forms a cavity with the female die portion 6 for molding the third split assembly member 33. When the ejecting plate 13 is stored (refer to FIG. 2), the pair of the rotors 22, 23 cannot rotate due to interference of the ejecting plate 13. When the ejected ejecting plate 13 is ejected (refer to FIG. 3), the pair of the rotors 22, 23 can rotate since there is no interference of the ejecting plate 13.

a. First Injection Molding Process

Next, a manufacturing method for an intake manifold 30 using the injection molding device 1 having the aforementioned structure will be described. As shown in FIG. 1, when the dies are closed, a cavity for the first split assembly member 31 is formed between the female die portion 4 of the fixed die 2 and the male die portion 17 of the sliding member 11. A cavity for the second split assembly member 32 is formed so as to be surrounded by the female die portion 5 of the fixed die 2, the male die portion 18 of the ejecting plate 13 and the insert die portion 20 of the rotor 22. A cavity for the third split assembly member 33 is formed between the female die portion 6 of the fixed die 2 and the male die portion 19 of the rotor 23. In this state, the molten resin injected from the first injection nozzle 7 is supplied to each of the cavities through the runner 9a. The first split assembly member 31, the second split assembly member 32, and the third split assembly member 33 are thus injection-molded.

b. Positioning Process

Figure 2:
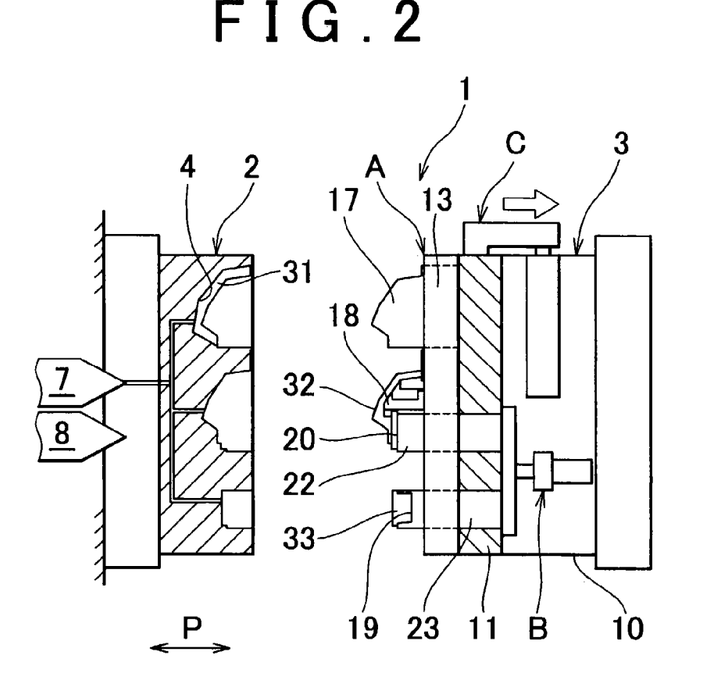
FIG. 2 is a sectional view showing the injection molding device according to the embodiment when the dies are open.
Figure 3:
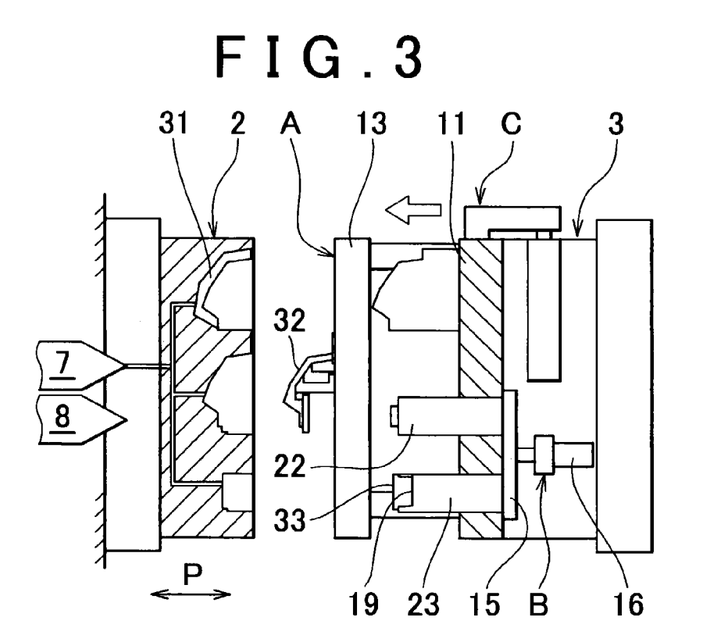
FIG. 3 is a sectional view showing the injection molding device according to the embodiment when an ejecting plate is ejected.
Figure 4:
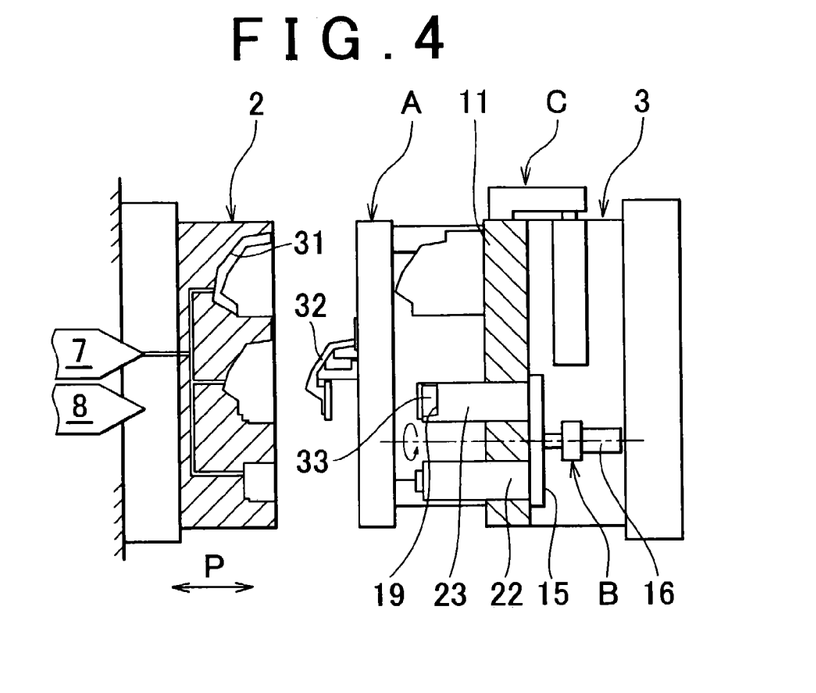
FIG. 4 a sectional view showing the injection molding device according to the embodiment when a rotating plate is rotated.
Figure 5:
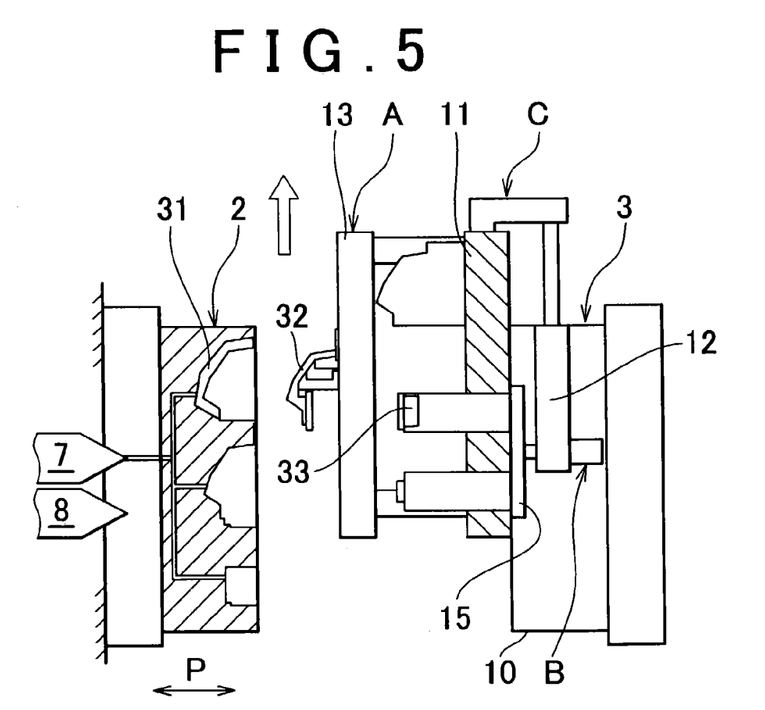
FIG. 5 a sectional view showing the injection molding device according to the embodiment when a sliding member is slid.

Then, as shown in FIG. 2, when the dies are opened, the first split assembly member 31 is supported by the female die portion 4 of the fixed die 2, the second split assembly member 32 is supported by the male die portion 18 of the ejecting plate 13 and the insert die portion 20 of the rotor 22, and the third split assembly member 33 is supported by the male die portion 19 of the rotor 23. Next, as shown in FIG. 3, the ejecting plate 13 is ejected in the die opening/closing direction P by the action of the drive cylinder (not shown), and the second split assembly member 32 is moved toward the fixed die 2 side. Thus, the phases of the first split assembly member 31, the second split assembly member 32, and the third split assembly member 33 are made different in the die opening/closing direction P. At this time, the rotors 22, 23 do not interfere with the ejected ejecting plate 13, and accordingly the rotating plate 13 can rotate. Next, as shown in FIG. 4, the rotating plate 15 is rotated at a predetermined angle (for example, 180 degrees) by the action of the drive motor 16, and the third split assembly member 33 which is supported by the male die portion 19 of the rotor 23 faces the lower end portion of the second split assembly member 32 in the die opening/closing direction P. Then, as shown in FIG. 5, when the sliding member 11 is moved upward by the action of the drive cylinder 12, the ejecting plate 13 and the rotating plate 15 move upward in accordance with the sliding member 11. As a result, the first split assembly member 31, the second split assembly member 32, and the third split assembly member 33 face one another in the die opening/closing direction P.

c. Second Injection Molding Process

Figure 6:
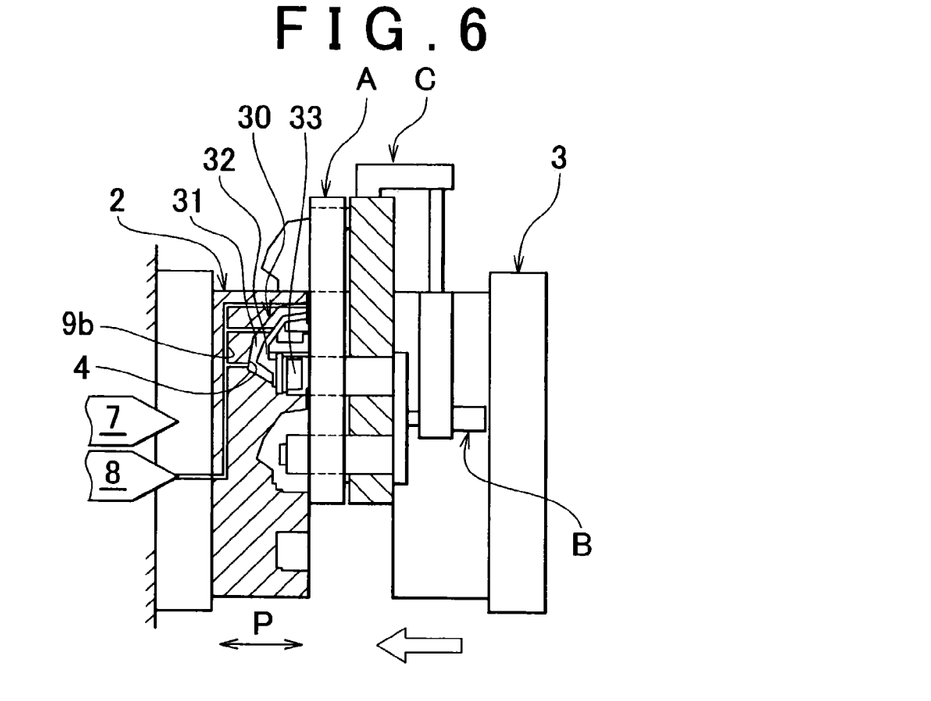
FIG. 6 is a sectional view showing the injection molding device according to the embodiment of the invention at a second injection molding time when the dies are closed.
Figure 7:
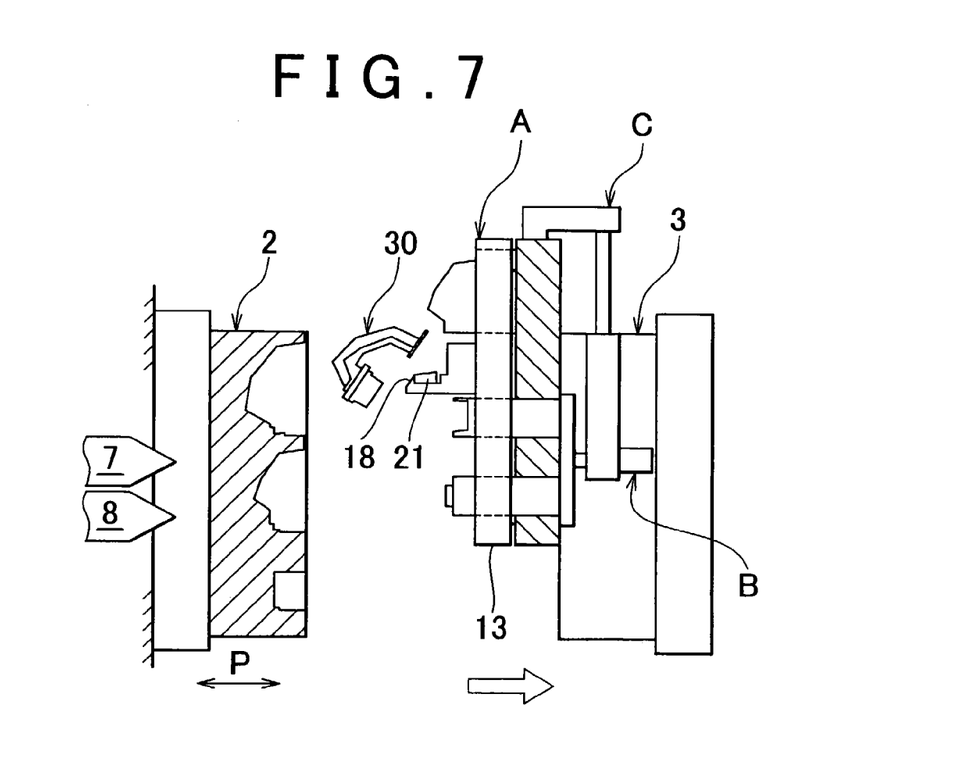
FIG. 7 is a sectional view showing the injection molding device according to the embodiment when the dies are open.
Figure 8:
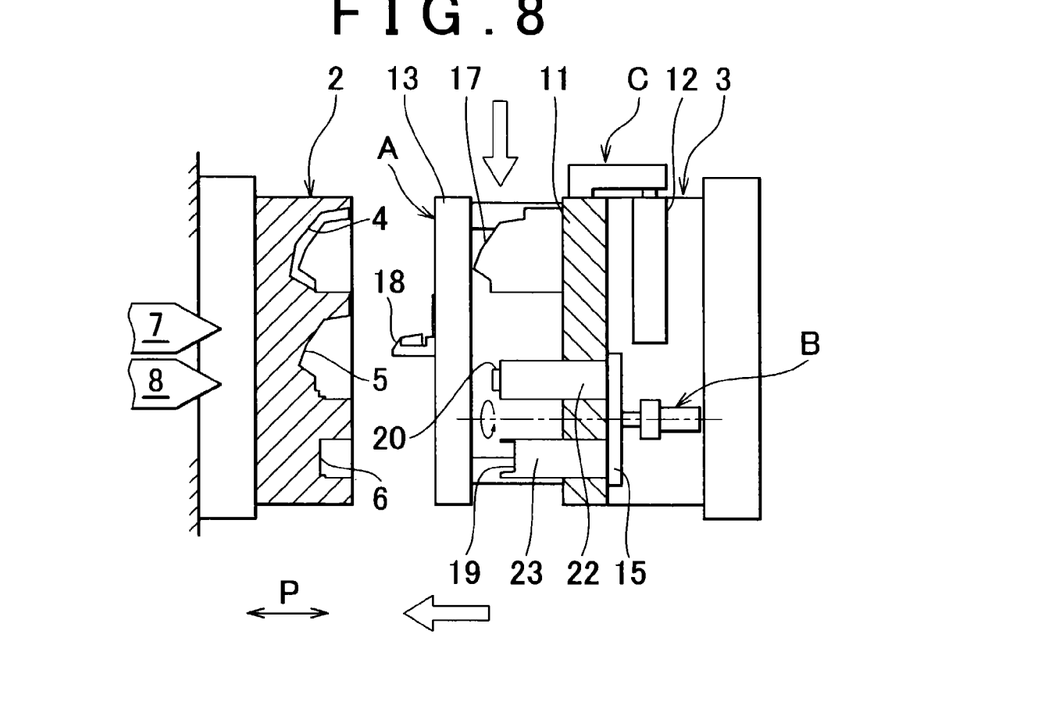
FIG. 8 a sectional view showing the injection molding device according to the embodiment when the rotating plate is rotated.
Figure 9:
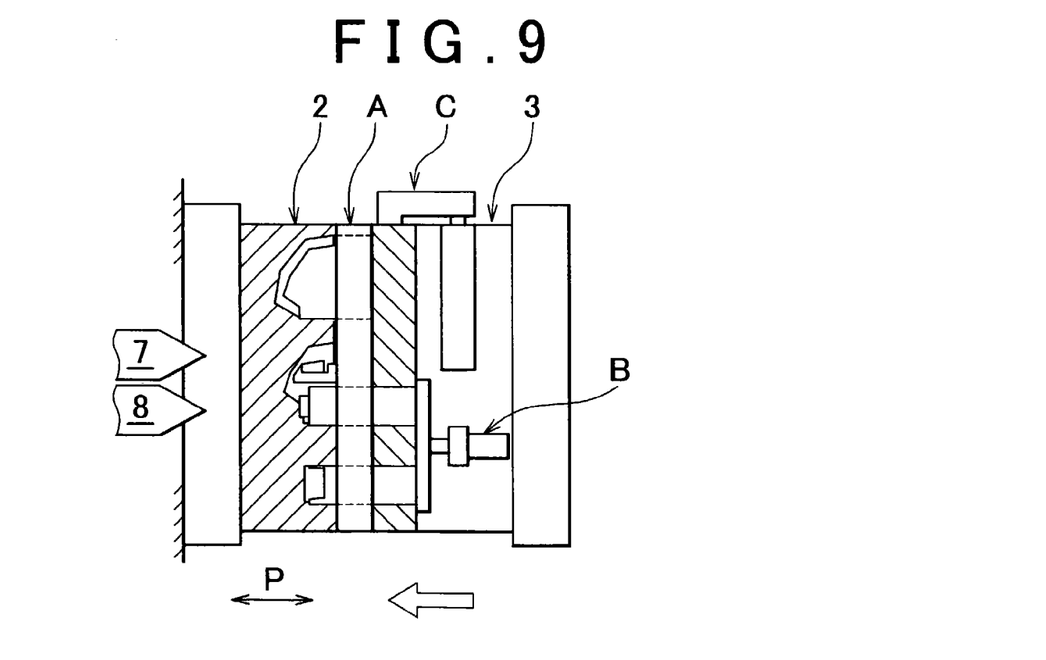
FIG. 9 is a sectional view showing the injection molding device according to the embodiment when the dies are closed.

Next, as shown in FIG. 6, when the dies are closed, the contact portion 31a of the first split assembly member 31, the contact portion 32a of the second split assembly member 32, and the contact portion 33a of the third split assembly member 33 contact one another, and the hollow passage 35 is formed so as to be surrounded by the contact portions 31a, 32a, 33a (refer to FIG. 11). Then, the molten resin injected from the second injection nozzle 8 is supplied into the hollow passage 35 through the runner 9b. Thus, each of the contact portion 31a of the first split assembly member 31, the contact portion 32a of the second split assembly member 32 and the contact portion 33a of the third split assembly member 33 is jointed with the corresponding contact portion, and consequently the intake manifold 30b is formed. Next, as shown in FIG. 7, when the dies are opened again, the slide core 21 is slid in a predetermined direction at the male die portion 18 of the ejecting plate 13 so as to release the intake manifold 30 from the male die portion 18 of the ejecting plate 13. Then, as shown in FIG. 8, the ejecting plate 13 and the rotating plate 15 are moved downward in accordance with the sliding member 11 by the action of the drive cylinder 12, and the ejecting plate 13 is ejected in the die opening/closing direction P by the action of the drive cylinder (not shown). Then, the rotating plate 15 is rotated at a predetermined angle (for example, 180 degrees) such that the male die portion 19 of the rotor 23 and female die portion 6 of the fixed die 2 face each other, and the insert die portion 20 of the rotor 22 and the female die portion 5 of the fixed die 2 face each other. Next, as shown in FIG. 9, when the dies are closed, the injection molding cycle ends.

As mentioned above, in the injection molding device 1 according to the embodiment, the sliding member 11 is supported by the movable die body 10 so as to be slidable in the direction perpendicular to the die opening/closing direction. The ejecting plate 13 is supported by the sliding member 11 so as to be movable in the die opening/closing direction P. The rotating plate 15 is supported by the sliding member 11 so as to be rotatable around the shaft center in the die opening/closing direction P. The ejecting mechanism A, the rotating mechanism B and the sliding mechanism C are thus provided on the movable die 3 side. Accordingly, when the ejecting plate 13 is ejected in the die opening/closing direction P so as to move the second split assembly member 32 toward the fixed die 2 side by the action of the ejecting mechanism while the dies are open after the first injection, the phases of the first split assembly member 31, the second split assembly member 32, and the third split assembly member 33 can be made different in the die opening/closing direction. As a result, when the rotating plate 15 is rotated so as to make the third split assembly member 33 face the lower end portion of the second split assembly member 32 by the action of the rotating mechanism B, and the ejecting plate 13 and the rotating plate 15 are slid in accordance with the sliding member 11 in the direction perpendicular to the die opening/closing direction P by the action of the sliding mechanism C, it is possible to make the first split assembly member 31, the second split assembly member 32, and the third split assembly member 33 face one another in the die opening/closing direction P. Therefore, when the dies are then closed, the contact portion 31a of the first split assembly member 31, the contact portion 32a of the second split assembly member 32, and the contact portion 33a of the third split assembly member 33 contact one another, and the contact portions 31a, 32a, 33a are jointed by the second injection. Thus, the intake manifold 30 can be obtained. As described so far, the intake manifold 30 including the first split assembly member 31, the second split assembly member 32, and the third split assembly member 33 is manufactured only by the injection molding process. Accordingly, compared with the conventional method in which the intake manifold is manufactured through the injection molding process, the vibration welding process and the like, it is possible to extremely efficiently manufacture the intake manifold 30. Also, since the vibration welding process is not required, flash is never generated, and a flash receiver needs not be provided. In addition, there is almost no restriction on the shape and the like of the molded product. Accordingly, it is possible to manufacture the intake manifold having a more complex shape. Also, compared with a conventional method in which simply two sliding mechanisms are provided, or simply two rotating mechanisms are provided, it is possible to provide a compact and simply-structured device.

According to the embodiment, a drive cylinder 12 of the sliding mechanism C is provided in the direction in which the sliding mechanism slides, and the drive motor 16 of the rotating mechanism B is provided along the rotational shaft of the rotating mechanism B, in the movable die body 10. Accordingly, it is possible to provide a more compact and simply-structured injection molding device 1. According to the embodiment, rotors 22, 23, which make a pair, are provided on the rotating plate 15 at rotationally symmetrical positions. The insert die portion 20 for molding the second split assembly member is provided on one rotor 22, the male die portion 19 for molding the third split assembly member 33 is provided on the other rotor 23, and the slide core 21 is provided on the male die portion 18 of the ejecting plate 13. Accordingly, it is possible to manufacture the intake manifold 30 having a more complex shape.

The invention is not limited to the aforementioned embodiment, and the invention may be realized in various other embodiments in which modifications are made within the scope of the invention. In the embodiment, when the dies are opened after the first injection, while the ejecting plate 13 is ejected (refer to FIGS. 3 to 5), the third split assembly member 33 is rotated by the rotating mechanism B such that the third split assembly member 33 and the second split assembly member 32 face each other. Then, the third split assembly member 33 and the second split assembly member 32 are slid upward by the sliding mechanism C, so that the first split assembly member 31, the second split assembly member 32, and the third split assembly member 33 face one another in the die opening/closing direction P. However, the invention is not limited to this configuration. For example, the first split assembly member 31, the second split assembly member 32 and the third split assembly member 33 may be made to face one another in the die opening/closing direction P in the following manner. While the ejecting plate 13 is ejected, the third split assembly member 33 and the second split assembly member 32 are slid upward by the sliding mechanism C such that the first split assembly member 31 and the second split assembly member 32 face each other. Then, the third split assembly member 33 is rotated by the rotating mechanism B such that the three members face one another. Alternatively, the third split assembly member 33 is slid upward by the sliding mechanism such that the third split assembly member 33 and the second split assembly member 32 face each other. Then, the third split assembly member 33 and the second split assembly member 32, which face each other, are rotated by the rotating mechanism such that the three members face one another.

In the embodiment, the second split assembly member 32 is moved in the die opening/closing direction P by the ejecting mechanism A such that the phases of the first split assembly member 31, the second split assembly member 32, and the third split assembly member 33 are made different in the die opening/closing direction P. However, the invention is not limited to this configuration. For example, the phases of the three members may be made different in the die opening/closing direction P by moving the second split assembly member 32 and the third split assembly member 33 in the die opening/closing direction P. In the embodiment, the sliding mechanism C is provided which slides the third split assembly member 33 and the second split assembly member 32 in the vertical direction on the movable die 3 side. However, the invention is not limited to this configuration. Instead of the sliding mechanism C, a sliding mechanism may be provided which slides the first split assembly member 31 in the vertical direction, on the fixed die 2 side. In the embodiment, the rotating plate 15 is rotated by 180 degrees by the rotating mechanism B so as to switch the positions of the rotors 22, 23. However, the invention is not limited to this configuration. For example, the positions of the rotors 22, 23 may be switched by rotating the rotating plate 15 by 90 degrees.

In the embodiment, the ejecting mechanism A, the rotating mechanism B and the sliding mechanism C are sequentially operated such that the first split assembly member 31, the second split assembly member 32 and the third split assembly member 33 face one another. However, the ejecting mechanism A, the rotating mechanism B and the sliding mechanism C may be operated in any order as long as the first split assembly member 31, the second split assembly member 32, and the third split assembly member 33 are positioned so as to face one another.

In the embodiment, the fixed die 2 is fixed. However, the fixed die 2 may include one of the ejecting mechanism A, the rotating mechanism B and the sliding mechanism C. Thus, it is possible to position the first split assembly member, second split assembly member, and the third split assembly member so as to face one another by moving both of the two dies.

What is claimed is:

1. A manufacturing device for a synthetic resin hollow molded body, comprising:
   a first die and a second die which mold a first split assembly member, a second split assembly member and a third split assembly member which are molded by a first injection and each of which has a contact portion that is jointed with a corresponding contact portion by a second injection;
   an ejecting mechanism which moves at least one of the first split assembly member, the second split assembly member, and the third split assembly member in a die opening/closing direction such that a phase of the member is made different from phases of the other members in the die opening/closing direction while the first die and the second die are open;
   a rotating mechanism which rotates at least one of the first split assembly member, the second split assembly member, and the third split assembly member around a shaft center in the die opening/closing direction while the first die and the second die are open; and
   a sliding mechanism which slides at least one of the first split assembly member, the second split assembly member, and the third split assembly member in a direction perpendicular to the die opening/closing direction while the first die and the second die are open, wherein the first split assembly member, the second split assembly member, and the third split assembly member are made to face one another in the die opening/closing direction by the ejecting mechanism, the rotating mechanism, and the sliding mechanism,
   wherein the second die includes the ejecting mechanism, the rotating mechanism, and the sliding mechanism; while the first die and the second die are open, the second split assembly member is moved in the die opening/closing direction by the ejecting mechanism such that the phases of the first split assembly member, the second split assembly member, and the third split assembly member are made different in the die opening/closing direction; the third split assembly member is rotated around the shaft center in the die opening/closing direction by the rotating mechanism; and the second split assembly member, and the third split assembly member are slid in a direction perpendicular to the die opening/closing direction by the sliding mechanism, whereby the first split assembly member, the second split assembly member, and the third split assembly member face one another in the die opening/closing direction.

2. The manufacturing device according to claim 1, wherein the sliding mechanism includes a sliding member which is supported by the second die body so as to be slidable in the direction perpendicular to the die opening/closing direction, and a slide driving portion which slides the sliding member; the ejecting mechanism includes an ejecting member which is supported by the sliding member so as to be movable in the die opening/closing direction, and an ejection driving portion which moves the ejecting member; the rotating mechanism includes a rotating member which is supported by the sliding member so as to be rotatable around the shaft center in the die opening/closing direction, and a rotation driving portion which rotates the rotating member; the first die includes a female die portion for molding the first split assembly member, a female die portion for molding the second split assembly member, and a female die portion for molding the third split assembly member; the sliding member includes a male die portion for molding the first split assembly member; the ejecting member includes a male die portion for molding the second split assembly member; and the rotating member includes a male die portion for molding the third split assembly member.

3. A manufacturing device for a synthetic resin hollow molded body, comprising:

a first die and a second die which mold a first split assembly member, a second split assembly member and a third split assembly member which are molded by a first injection and each of which has a contact portion that is jointed with a corresponding contact portion by a second injection;

an ejecting mechanism which moves at least one of the first split assembly member, the second split assembly member, and the third split assembly member in a die opening/closing direction such that a phase of the member is made different from phases of the other members in the die opening/closing direction while the first die and the second die are open;

a rotating mechanism which rotates at least one of the first split assembly member, the second split assembly member, and the third split assembly member around a shaft center in the die opening/closing direction while the first die and the second die are open; and a sliding mechanism which slides at least one of the first split assembly member, the second split assembly member, and the third split assembly member in a direction perpendicular to the die opening/closing direction while the first die and the second die are open, wherein the first split assembly member, the second split assembly member, and the third split assembly member are made to face one another in the die opening/closing direction by the ejecting mechanism, the rotating mechanism, and the sliding mechanism, wherein the second die includes the ejecting mechanism, the rotating mechanism, and the sliding mechanism; while the first die and the second die are closed, phases of the first split assembly member, second split assembly member, and the third split assembly member are made different in the direction perpendicular to the die opening/closing direction at the first injection time; the first die and the second die are opened so as to move second split assembly member, and the third split assembly member in the die opening/closing direction, and while the first die and the second die are open, the second split assembly member is moved in the die opening/closing direction by the ejecting mechanism such that the phases of the first split assembly member, the second split assembly member, and the third split assembly member are made different in the die opening/closing direction; the third split assembly member is rotated around the shaft center in the die opening/closing direction by the rotating mechanism such that second split assembly member, and the third split assembly member face each other in the die opening/closing direction; and the second split assembly member, and the third split assembly member are slid in the direction perpendicular to the die opening/closing direction by the sliding mechanism, whereby the first split assembly member, the second split assembly member, and the third split assembly member face one another in the die opening/closing direction.

* * * * *